United States Patent [19]

Diana

[11] Patent Number: 4,769,191

[45] Date of Patent: Sep. 6, 1988

[54] MONOLITHIC SURFACE ORNAMENTATION OF PRE-CAST REINFORCED CONCRETE WALL

[76] Inventor: Silvio Diana, 203 Yoakum Pkwy., Alexandria, Va. 22304

[21] Appl. No.: 910,548

[22] Filed: Sep. 23, 1986

Related U.S. Application Data

[62] Division of Ser. No. 604,181, Apr. 26, 1984, Pat. No. 4,665,673.

[51] Int. Cl.[4] .......... B28B 1/08; B28B 1/32; B29C 39/12; B29C 41/08

[52] U.S. Cl. .......... 264/25; 264/69; 264/226; 264/245; 264/256; 264/309; 404/82

[58] Field of Search .......... 264/256, 25, 225, 226, 264/309, 74, 245, 69, 255, 219, 220, 227; 52/314, 315, 316, 102; 404/6, 7, 82

[56] References Cited

U.S. PATENT DOCUMENTS

| | | | |
|---|---|---|---|
| 405,800 | 6/1889 | Ransome . | |
| 909,792 | 1/1909 | Henderson | 264/74 |
| 1,571,849 | 2/1926 | Long | 264/256 X |
| 1,743,527 | 1/1930 | Calderazzo . | |
| 2,819,495 | 1/1958 | Krausz . | |
| 3,177,279 | 4/1965 | Bilodeau . | |
| 3,179,725 | 4/1965 | Schultz et al. | 264/220 |
| 3,621,086 | 11/1971 | Guide | 264/256 |
| 3,702,180 | 11/1972 | Jones . | |
| 3,742,853 | 7/1973 | Landsman | 264/321 |
| 3,939,238 | 2/1976 | Salts | 264/309 |
| 3,991,145 | 11/1976 | Landsman | 264/48 |
| 3,999,918 | 12/1976 | Landsman | 264/25 |
| 4,064,205 | 12/1977 | Landsman | 264/321 |
| 4,511,520 | 4/1985 | Bowen | 264/25 |

FOREIGN PATENT DOCUMENTS

| | | | |
|---|---|---|---|
| 2308515 | 12/1976 | France | 264/256 |

*Primary Examiner*—Jan H. Silbaugh
*Assistant Examiner*—Karen D. Kutach
*Attorney, Agent, or Firm*—Jim Zegeer

[57] ABSTRACT

A reinforced concrete wall, such as a road barrier or barricade, has a monolithic surface ornamentation thereon constituted by pigmented cements and grooves simulating mortar joints. In the horizontally oriented top portions of the wall where the pigmented cements are substantially thicker than the layers of pigmented cements monolithically joined to the vertical oriented portions of the wall so that these portions, which are subject to chipping and the like during handling and use will retain their aesthetically pleasing appearance. In the molding process, ribs on the mold surface which will form the grooves have a retardant applied thereto so that the cement forming the mortar joint will set at a slower rate than the rest of the body of the concrete wall and when removed from the mold can be brushed. When the wall is in the form of a road barrier, the ends are provided with a conical projection and a conical recess, respectively, to provide coupling between adjacent wall units.

9 Claims, 8 Drawing Sheets

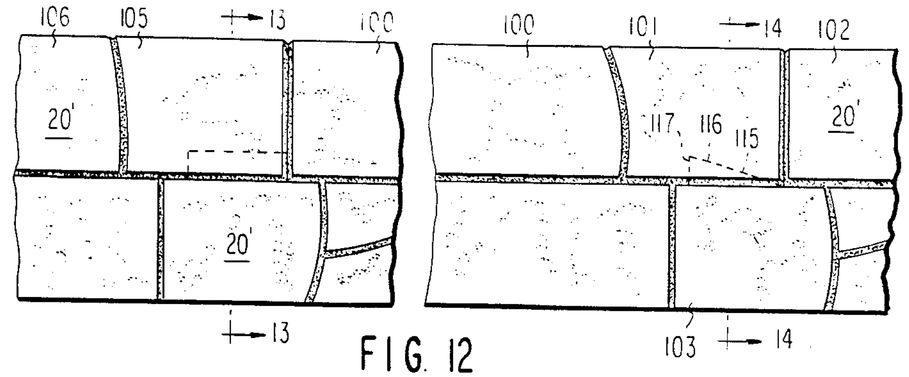
FIG. 12
FIG. 13
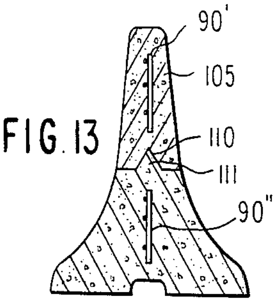
FIG. 14
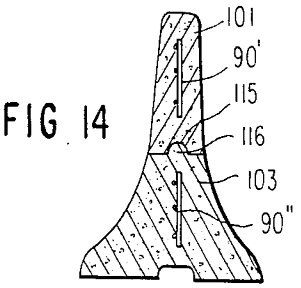
FIG. 15a
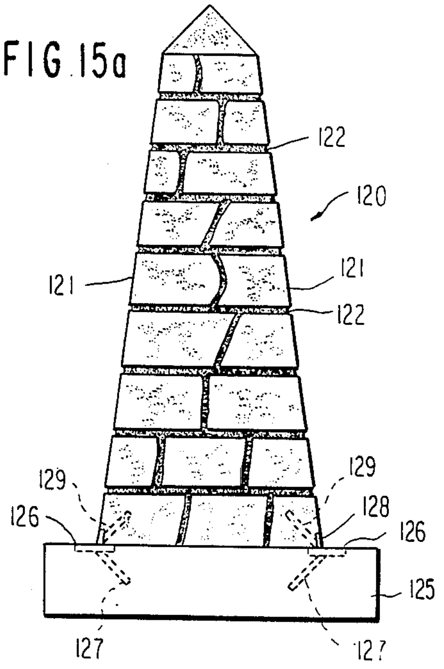
FIG. 15b
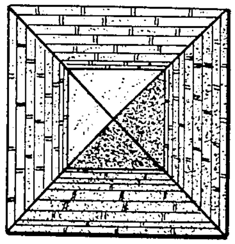

MONOLITHIC SURFACE ORNAMENTATION OF PRE-CAST REINFORCED CONCRETE WALL

This is a divisional of application Ser. No. 604,181, filed Apr. 26, 1984, now U.S. Pat. No. 4,665,673.

BACKGROUND AND BRIEF DESCRIPTION OF THE INVENTION

The invention relates to forming monolithic decorative surfaces on concrete walls, particularly pre-cast concrete walls, and, more particularly, pre-cast concrete road barriers of the type known as "New Jersey" style traffic barricade made of pre-cast reinforced concrete.

It has been known in the past to form surface ornamentations on concrete slabs, tiles, building structures and the like to simulate brick and stone wall. However, in the case of traffic barricades, for example, these have almost universally been of the typical light gray structures of the New Jersey style barricade with little or no surface ornamentation. When these structures are used to replace existing stone barriers, barricades and the like, while the safety features inherent in such structures is highly desirable, the drabness of such structures creates resistance to their use particularly in park areas and the like where a natural appearing structure is desirable. An object of the invention is to provide a cast concrete wall with a monolithically formed surface structure which has an aesthetically pleasing appearance at relatively low cost.

As noted above, there have been efforts in the past to provide concrete building walls, tiles, blocks with stone or block appearances. For example, in Dexter U.S. Pat. Nos. 836,368 and 748,352, concrete building walls, typically cast in situ are disclosed wherein a molding box having one side shaped in the form of building blocks has cast thereagainst the concrete to form the surface simulation of natural stone or block and, with particular reference to the present invention, in Dexter U.S. Pat. No. 836,368, a molding board is provided with a plurality of distributing fingers to prevent the coarser grades of concrete and gravel to be directed to the rear of the molding box which finer portions being distributed against the molding box which is to form the exposed viewing side of the wall. In Schillinger U.S. Pat. No. 88,747, the manufacture of artificial stone is disclosed in which coarser and finer facing material are mixed with coloring material or pigments and used as the facing materials used to fill the remaining part of the mold. In Henderson U.S. Pat. No. 909,792, a facing artificial stone is disclosed in which the facing material is placed into a molding box mold form and then a preferred concrete block is pressed onto the material in the mold until the final set of the facing material. Finally, in Chappell U.S. Pat. No. 957,188, an ornamental tile is formed by projecting upon a form cavity a plastic material which is caused to conform to a predetermined outline and which is allowed then to harden and against which a quantity of cementitious material which is adhesive to the first material is cast and allowed to harden.

According to the present invention, a mold is formed having ribs corresponding to the mortar joints desired in the final product and the ribs are coated with a retardant and then shielded by a shield having the outline or pattern of the mold joints. If a simulated stone wall is desired, the rib or mortar joint pattern is in the form of the perimeters of the "stone" and the sectors or spaces defined by the raised ribs defining the mortar joint can be blocked off between the masked areas. Pigmented cements, which are pigmented according to any desired color but a typical example for a "natural" stone wall will be (1) light brown, (2) dark brown and (3) dark gray and black. These pigmented cements are mixed, in receptacles and then individually sprayed as by gunnite type spraying apparatus, in the different mold sectors, the block outs being removed as each cement with its pigmentations are sprayed into the mold. Where the top "stones" in a horizontal wall section are being formed, a heavy bed of the same colored mortar and of the same consistency is applied in the mold in the sectors that ultimately form the top "stones". The masking material for the ribs forming the mortar joints is removed and the mortar joints then are sprayed with a mortar cement having the color of the joint desired in the wall being formed and may, of course, be a neutral gray mortar cement. If both sides of the concrete wall are to have "stone" facing, a second mold half is prepared in the same way and the two mold halves joined.

Then a reinforcing material such as a steel reinforcing cage or fabric is positioned in the mold and the mold is then filled with concrete prior to the setting or curing of any of the sprayed cements or colored cements. Care is taken to assure that the concrete that is loaded into the mold does not impinge with any force against the sprayed on pigmented cements to assure that the surface continuity of the "stone" is not disturbed in the mold. Typical molding procedures can be carried out such as the use of agitators and vibrators to reduce and eliminate air bubbles and to assure proper constant consistency in the concrete and also to assure a certain amount of admixing at the interface between the previously sprayed layers and coatings of cement and the concrete to assure the desired monolithticity in the final product. In addition, in the case of the New Jersey style road barriers, since it is cast upside down, with the top being at the bottom of the mold, wooden forms may be pressed into the concrete to form grooves and the like therein.

In a preferred embodiment of the invention, the wall sections have coupling elements formed in the ends thereof which are constituted by half conical projections and half conical recess formed in the ends of the walls or barricades.

BRIEF DESCRIPTION OF THE DRAWINGS

The above and other objects, advantages and features of the invention will become more apparent when considered in conjunction with the following specification and accompanying drawings wherein:

FIG. 12 is a side elevational view of a plurality of highway traffic barricades incorporating the invention, FIG. 13 is a sectional view through lines 13—13 of FIG. 12, and FIG. 14 is a sectional view through lines 14—14 showing a modification of the coupling elements between the overlapping portions of the barricades shown in FIG. 12, FIG. 15*a* is a side elevational view of a pylon incorporating the invention and FIG. 15*b* is a top view thereof.

FIGS. 1–6 disclose a pre-cast New Jersey style highway traffic barrier comprised of the pre-cast reinforced concrete and has a symmetrical cross-section with the top horizontal surface 11, a pair of symmetrically disposed substantially vertical planar sides 12 and 13, respectively, and a pair of outwardly flaring curved lower side surfaces or skirts 14 and 15, respectively, and lower base sections 16 and 17, respectively, all in conformance with Government specifications, the shape generally being known as the New Jersey style barrier or barricade, which is designed so as to cause a vehicle engaging the barrier to be directed back in an opposite direction towards the highway and away from the barrier and of a height to preclude vehicles going over the barrier. These concrete barricades have conventional steel reinforcing in them and average more than two tons per twelve foot section and thus are relatively stable and stationary structures and while frequently temporary may ultimately be located at locations for many years on end. While these structures have sometimes been painted in the past, they almost universally have smooth drab surfaces which are aesthetically unappealing in natural park like settings, as for example, along the Skyline drive operated by the National Park Service in Virginia.

According to this invention, artificial stone like sectors or blocks 20-1, 20-2, 20-3 . . . 20-N are formed in the surface as part of the monolithic concrete slab. Each of the sectors 20-1, 20-2, 20-3 . . . 20-N is colored by use of pigmented or colored cements which are sprayed into the respective sectors in a process to be described more fully hereafter. In FIG. 1, the color schedule, which is purely arbitrary, may be as follows: those sectors with the numeral 1, light brown, those sectors with the numeral 2, dark brown and those sectors with the numeral 3, blue-black. It will be appreciated that other natural stone colors such as redish-browns, slates, slate colors and even varigated colors can be used, the basic objective when forming a stone wall being to give different sectors the appearance of natural stone and the joints the appearance of mortar, all of which are monolithically formed with a concrete mass.

Figure 1:
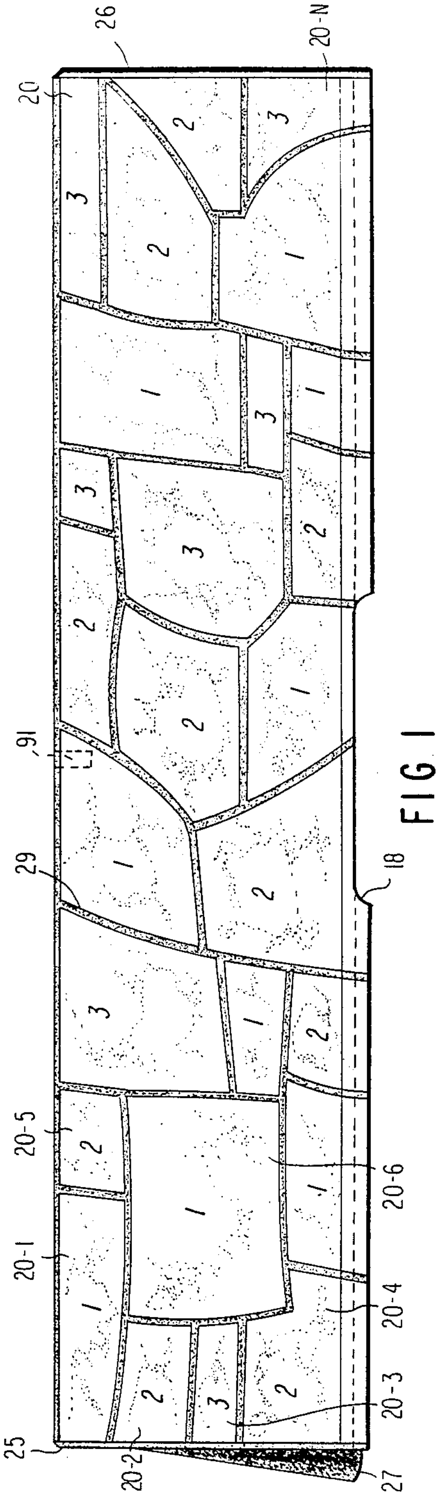
FIG. 1 is a side elevational view of a pre-cast reinforced concrete wall having the surface ornamentation of an artificial stone with the mortar joints therein.

The following formulations of colored cements have been utilized in test panels incorporating the invention:

LIGHT BROWN 47 pounds of grey portland cement
70 pounds (one bucket) of white sand
1 pound brown pigment #4690 (by Muirkirk)
about 3 gallons of water of a quantity sufficient to allow guranite type spraying of the cement into the mold without unduly running on the vertical surfaces.

DARK BROWN

Same as light brown except 2 pounds of brown pigment #4690.

BLUE BLACK 47 pounds of grey portland cement
70 pounds of white sand
1 pound of PHTHALTD BLUE pigment
$\frac{1}{8}$ pound of black pigment
same water as in the above formulations.

Various other formulations commonly used to color concrete or cement works may be used.

The lateral ends 25, 26 are provided with coupling elements 27, 28 which, in this preferred embodiment are constituted by a conical projection 27 in end 25 and a conical recess 28 in end 26, these structures being formed in the molding process. These conical surfaces have the advantage that dirt and debris slide readily off and do not interfere with the fit and the water drains down easily. In some cases, conical projections may be formed on both ends of the concrete wall and in some cases conical recesses may be formed on both ends of the concrete walls. Longitudinal and transverse drainage slots 18 and 19 are formed in the base surface and may serve as alignment elements. It will be appreciated that adjacent barrier elements may have the pattern repeating so that while there may be a vertical line where two abutting barriers meet, the sector designated as 20-*a*, 20-*b* and 20-*n* have the appearance as if another part of those sectors appeared in the next succeeding wall element or barrier.

Figure 2:
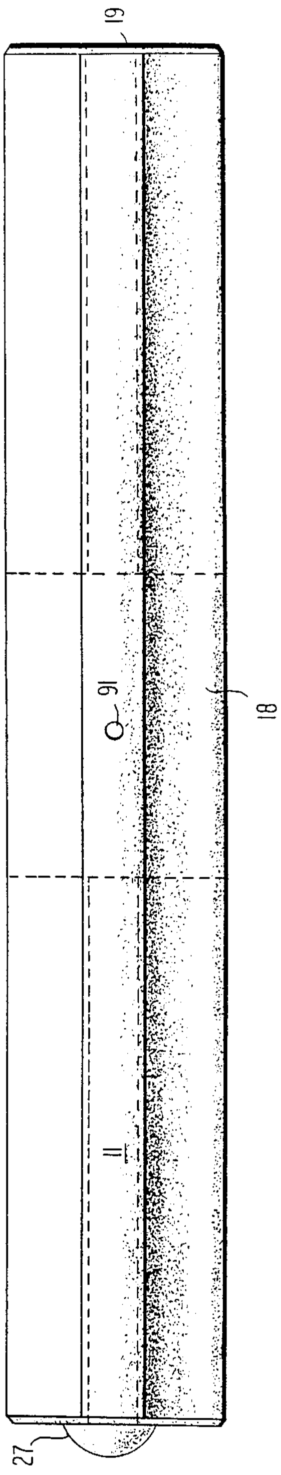
FIG. 2 is a top plan view of FIG. 1.

Finally, as shown in FIGS. 1 and 2, an insert 91 is provided for threadably receiving signs, or other indicia. It will be appreciated that some of the sectors may have embedded in them inserts such as roadway signs and the like but, in the preferred embodiment, this is not done since the basic objective is to provide a highly decorative and aesthetically pleasing artificial stone (or brick or block) wall, for example, as opposed to the usual dull, drab, gray concrete slab found along the highways.

THE PROCESS

Figure 3:
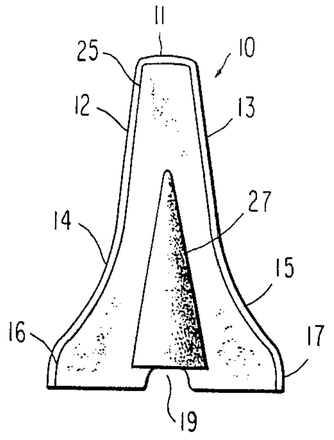
FIG. 3 is an end view showing the projecting half cone.
Figure 4:
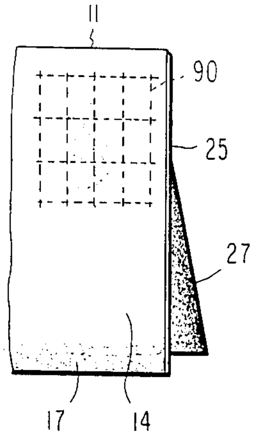
FIG. 4 is a side sectional view thereof.
Figure 5:
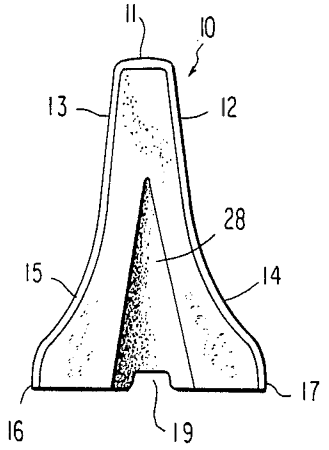
FIG. 5 is an end view showing the conical recess forming part of the coupling unit.
Figure 6:
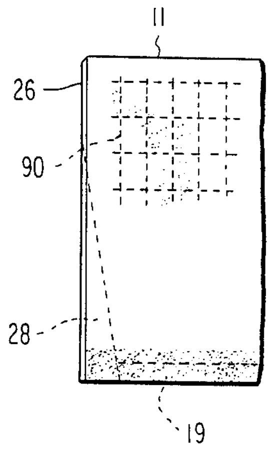
FIG. 6 is a partial side sectional view of FIG. 5
Figure 7:
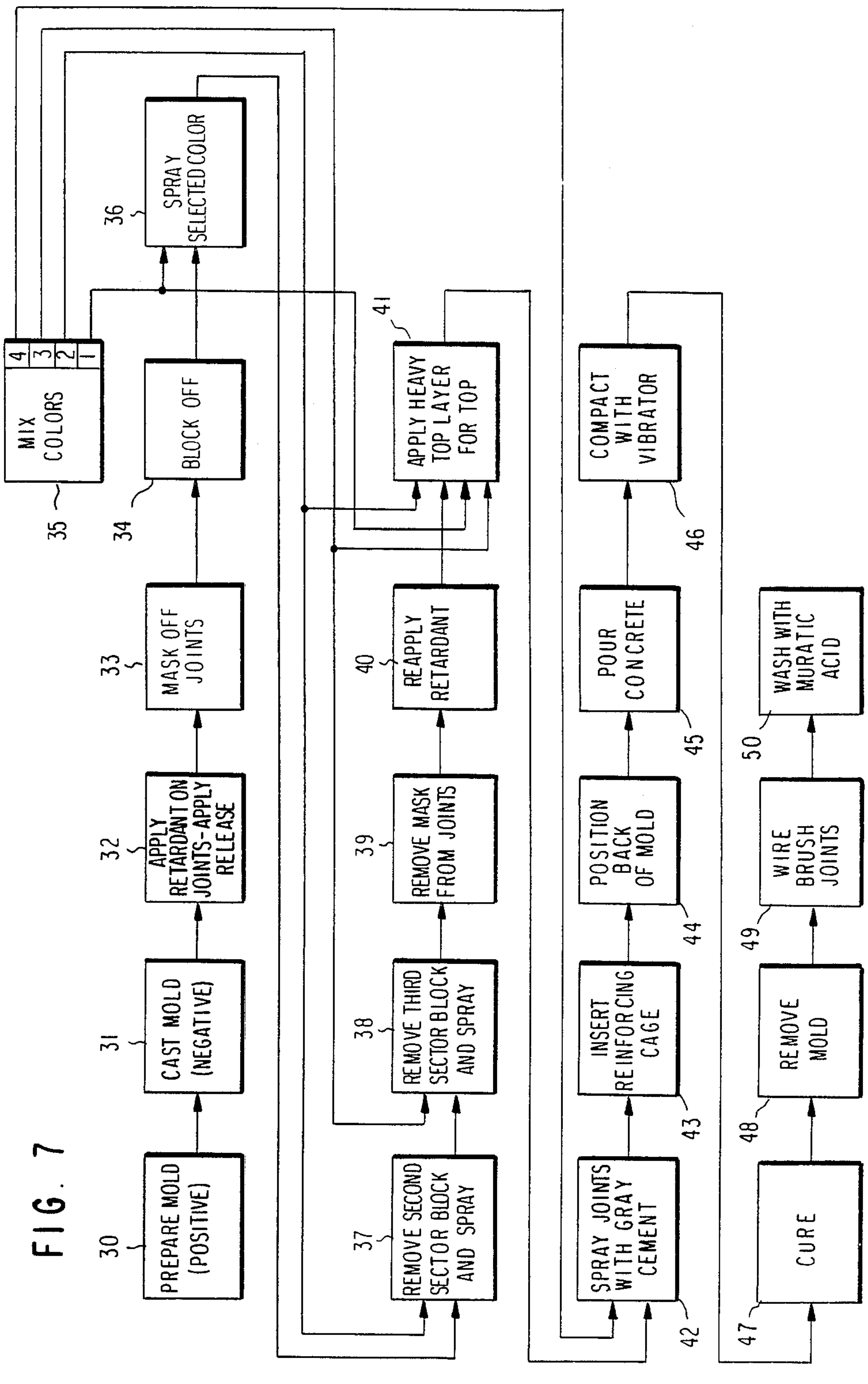
FIG. 7 is a flow diagram showing the process according to the present invention.
Figure 8:
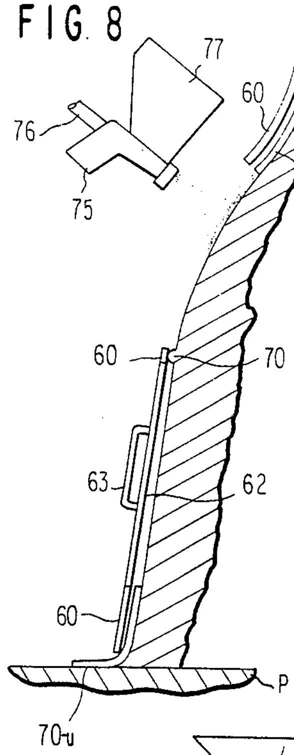
FIG. 8 is a schematic sectional view illustrating the application of the artificial stone facing to a sectional portion of the mold and the block out and grid shielding other portions of the mold from the sprayed particles.
Figure 9:
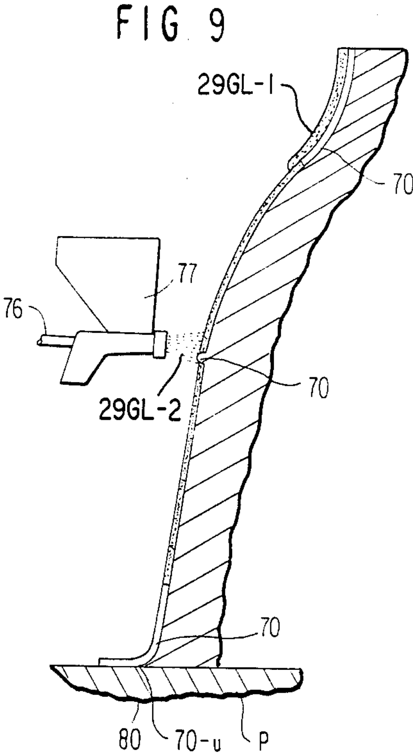
FIG. 9 shows a further stage in the process wherein the joints are being sprayed with a mortar cement.
Figure 10:
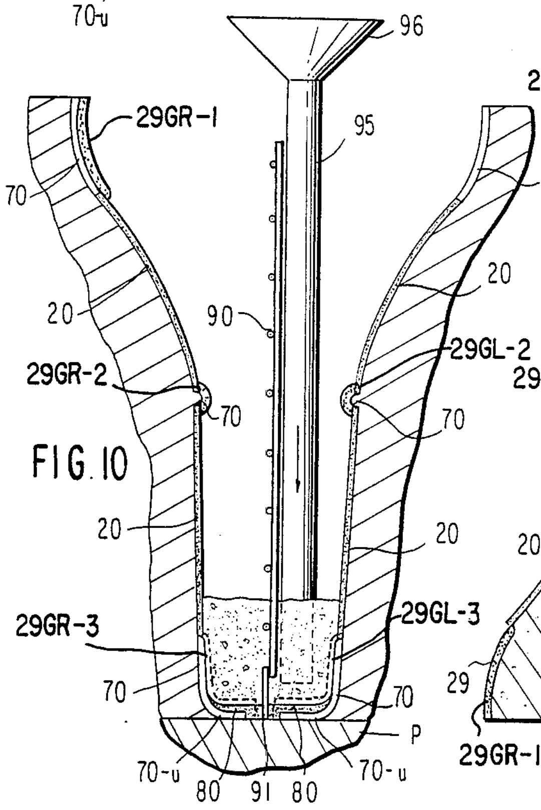
FIG. 10 is a sectional view illustrating the filling of the mold with concrete to assure that the concrete does not, as it is poured into the mold form, disrupt the still "wet" pigmented cement forming the facing stones and joints.

Referring to the process illustrated in the flow diagram in FIG. 7 and the schematic process steps illustrated in FIGS. 8–10, the mold is prepared by first making a positive as indicated in block 30. In a preferred practice of the invention, the positive is prepared by shaping styrofoam blocks to have the surface shape illustrated in FIGS. 3 and 5. A black paint or other radiant energy absorbant material is applied in the pattern of the grooves 29 (FIG. 1) and then radiant energy is directed upon the radiant energy absorbant material which converts the absorbed radiant energy to heat so as to melt and form a pattern of the grooves in the surface of the styrofoam. A concrete base is then cast against the foam to form the negative mold as indicated in block 31. It will be appreciated that only one side of the wall need have the decorative surface formations thereon in which case, only one mold half need be prepared (a variety of mortar joint forming ribs in separate mold sections will give the wide variety of stone shape). However, if it is desired that both sides of the wall have the pattern of artificial stone simulation therein, then a second and opposing mold half is prepared, this second mold half being shown diagrammatically in FIG. 10. This mold half is mounted upside down with the narrow top portion down and the wider base up. In case it is desired that the wall have a rectangular cross-section then this inversion of the mold is not necessary.

After the mold (S) is constructed, a retardant commonly used in precast concrete work to provide exposed stones or pebbles, is applied to the joints (one such retardant that has been successfully used in the practice of the invention is lilac retardant by Treco Company) and the surfaces of the mold in the various sectors have a release material applied thereto which can be a grease, oil or the like. A mask is prepared having the pattern of the grooves shown in FIG. 1 and the mask 60 in this case was made out of relatively thin flexible plywood and the sectors corresponding to 20-1, 20-2, 20-3 . . . 20-n which are cut from the plywood are used to form block outs 62 (FIG. 8) with small handles 63 thereon. The purpose of these is to block off the sectors during the spraying of the selected colors in the different areas. Thus, after the joints are masked off as indicated in block 33 of FIG. 7, the sectors are blocked off as indicated in box 34 of FIG. 7. Thus, just prior to spraying the pigmented cement into all of the areas designated No. 1, the remaining sectors, those designated with the 2's and the 3's are blocked off so that the colored pigment cement that is sprayed into the sectors designated No. 1 do not impact on any sectors in 2 and 3 nor on the joint forming ribs 70 which are part of the mold. As indicated in block 35, the colors have been mixed and in this case, four colors, (the gray joint cement is deemed a color). It is important that the cement mix for the colors have the proper consistency because they will be sprayed on the substantially vertical surfaces as indicated in FIGS. 8 and 9 so they should not run. The consistency is essentially that used in the gunniting process for forming vertical swimming pool walls and the like. As indicated in FIG. 8, the spray gun 75 is supplied with compressed air on a line 76 for spraying pigmented cement contained in a hopper 77 which gravity feeds cement into gun 75. Rib mask 60 protects the ribs pattern 70 and the block outs 62 protect those areas that it is not desired to have the color being sprayed at that time deposited upon. Other powered forms of applying the pigmented cements can be used in the practice of the invention. After the base color for that particular sector has been deposited, it is not necessary to replace the block out 62 during the spraying of the other colors because any pigmented cement which is deposited in the back of the previously sprayed cement does not come through or distort the color and simply forms a part of the monolithic layer in conjunction with the color that has been deposited and when the concrete is cast as indicated in FIG. 10. The spraying of the selected color as indicated in block 36 is shown diagrammatically in FIG. 8. In block 37, the second sector block outs are removed such as the block out 62 and the second desired color pigment is then sprayed into those sectors designated with the numeral two. Finally, as indicated in block 38, the third sector blocks covering or blocking sectors designated with the numeral three are removed and the third color is then sprayed.

In each case, the thickness of the sprayed cement is approximately $\frac{1}{4}$ to $\frac{3}{8}$ of an inch but it could be greater or less thick. As indicated in block 39, the mask 60 is removed and the joints then cleaned of any mortar cement that may have been deposited and the retardant reapplied as indicated in block 40. It is not necessary to reapply the retardant but it does aid in uniformity of the joints.

Figure 11:
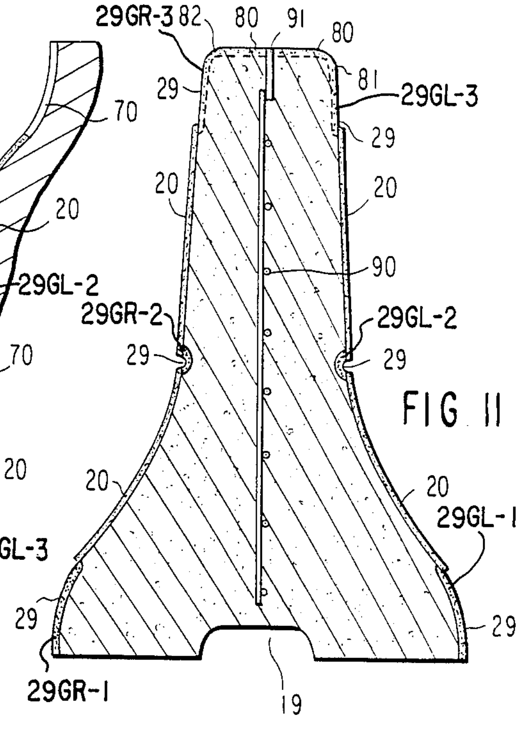
FIG. 11 is a sectional view of a pre-cast road New Jersey barrier incorporating the invention.

As indicated in block 41, a heavy top layer is applied in those sector areas 20 which form the top of the concrete wall. This is indicated at 80 in FIGS. 9 and 10 and is illustrated in the cross-sectional view of FIG. 11. The purpose of this heavy top layer which, it will be noted in FIG. 11 is extended over and includes the edges 81, 82 is to take account of possible chipping that occurs on the edges so that if any of the top edge is chipped or broken away, there is still sufficient colored cement below the chipped away portion to still give the appearance and resemblance and effect of a solid stone block. In this case, care is taken to assure that the colorant is not applied at this time on the ribs 70-U forming what will become the upper part of the wall. As is shown in FIG. 9, the rib 70 for forming the joints 29 (FIG. 1) which, as indicated in blocks 32 and 40 have a retardant applied thereto for retarding the curing of cement is sprayed with a gray cement as indicated in block 42 of FIG. 7. The sprayed joint cement, indicated at 29GL-1, 29GL-2, 29GL-3, 29GR-1, 29GR-2 and 29GR-3 is brushed with a wire brush to give the typical brushed appearance of a mortar joint. The color gray is typical for a joint cement but it will be appreciated that it can be any other desired color which has been pigmented into the cement.

If the finished wall is to have both sides appear as a solid block wall, the second mold half will be made in the same way and placed in position on the support platform P. The end panels carrying the cone projection 27 and the cone recess 28 (not shown in FIGS. 8–10) are flat plates which close off the ends of the mold. In this embodiment, the article being formed e.g. the New Jersey style road barrier is much wider at the base than it is at the top so it is cast upside down.

Referring now to FIG. 10, the mold is shown in its assembled relationship with a reinforcing cage 90 positioned in the center. This reinforcing cage has attached to it an insert 91 which receives threaded fasteners and the like for signs etc. The ribs 70 have the gray cement thereon and the colored cements are in the respective mold sectors designated 20 in FIG. 10 and these pigmented mortars as well as the mortars on the joints forming ribs 70 have only been just previously applied for a short time and hence have not set or cured.

Concrete is introduced into the thus positioned mold walls in such a way as to assure that the heavy concrete and the aggregates therein do not impinge with any degree of force upon the colored cement sections as well as on the rib sections to thereby assure the surface integrity of the pattern and that none of the conventional concrete will be seen in the "stone" facing. Thus, if only one half of the mold has the colored cement thereon e.g., only one half of a simulated wall surface is formed, the concrete can be allowed to pour on the opposite or nonembellished or non "stone" surface and away from the surface having the artificial stone formations therein. However, as shown in FIG. 10, the concrete can be introduced by way of a tremie tube 95 having a hopper 96 at the surface thereof for receiving the concrete. Alternatively, the concrete can be pumped from a supply with the tube down in the base of the mold cavity and fill the mold from the bottom up with the lower end of the tube always remaining just below the surface of the cement as it rises in the mold so as to assure the absence of air pockets and the like. After the mold is filled with the concrete, the concrete is then compacted with a conventional vibrator inserted into the fluid concrete, as is indicated in block 46. In addition to the conventional improvement in the quality of the concrete, in the elimination of air bubbles and pockets and the like, the vibrator enhances the monolithicity of the finished product by achieving a slight blending action of the colored cement with the contiguous poured concrete particles.

Furthermore, when both sides of the mold are for forming artificial stone, brick or block facing, the central poured concrete mass is formed by the tremie pipe method as is shown in FIG. 10, with the tube remaining immersed in the concrete and rising slowly with the rise of the level of the concrete to where the concrete mass is complete. This assures that the aggregates in the concrete do not impinge on the thin artificial stone facing which has just been sprayed into the mold sections and has not yet begun to cure or set.

When the concrete is being poured from the top down, care is taken to assure that the falling concrete does not impinge on the recently sprayed facings, groove cement etc. forming the decorative exterior surface of the final product.

After the compacting with the vibrator as indicated in block 46, a wooden frame is pressed into the mold to form the longitudinal drain 19 and transverse drain 18. As indicated in block 47, the concrete and pigmented cement facings are allowed to set and cure before the mold is removed. The groove cements 29GL-1, 29GL-2, 29GL-3, 29GR-1, 29GR-2 and 29GR-2, which include the retardant transferred thereto from the ribs 70 so as to delay the curing thereof, are treated by a brush as indicated in block 49 to give the joints a rough appearance and then the entire unit is washed with muratic acid to remove the skin formed adjacent the mold surfaces, help prevent sprawling and effervescence of the underlying concrete slab.

As shown in the cross-sectional view of FIG. 11, the top of the wall has a relatively thick layer of pigmented cement which is monolithically joined to the underlying concrete base and, as indicated earlier, provides a safe guard in case of chipping as by objects being dropped on the top edge corners of the wall. The only discontinuities in the surface of the wall are those forming the grooves. The remaining surface portions of the wall formed by the colored or pigmented cements are monolithically joined to the underlying concrete base which monolithicity is enhanced by the fact that the pigmented cement forming the stone facings are still "wet" and uncured at the time the concrete is poured and the concrete is vibrated by the vibrators which assures a blending of the two cements forming the interface between the pigmented surface layers, including the joint, and the underlying concrete core.

As shown in the modification illustrated in FIG. 12, the ends of the barricade can overlap by one half (or more) "stone" e.g., a portion of the pre-cast structure on the right end 101 of barricade 100 extends in overlapping fashion over the lower left and 103 next succeeding adjacent barricade 102. The left end 104 of barricade 100 has the lower portion thereof extended in underlying fashion to the overlapping portion 105 of a further next succeeding barricade 106. The "stone" simulations 20' can, of course, have any pattern desired.

As shown in FIG. 13, the lower surface of overlap extension has a "V" shaped groove 110 formed therein and the underlapping portion 103 of barricade 102 has a complementary shaped rib or projection 111 thereon to assure easy alignment of the barricades. For curved walls, the groove 110 and complementary shaped rib 111 can be given a curved or arc shape to correspond to the curvature of the highway, for example. The extensions of reinforcing steel fabric 90' overlap portion 101 and 90" in the underlap portion 103 assures strength of these portions.

As shown in FIG. 14, the coupling elements can have the conical shape shown in FIGS. 3, 4, 5 and 6. In this case, the conical groove 115 tapers toward the end of the barricade, e.g., the wider base portion 116 of the conical groove is towards the center of the base. The complementary rib 116 is likewise conically shaped and has the large base end at the end of the barricade to this arrangement assures easy alignment and, at the same time, the two sloping conical surfaces tend to guide the barricades together.

It can be anticipated that the base surface on which the barricades are to be placed may be uneven so that the surface on which one barricade is placed is slightly above or below the surface an adjacent barricade is placed. In the embodiment shown in FIGS. 12–14, the overlapping ends assure even alignment and the steel reinforcement extensions assure strength.

While I have shown and described my simulated concrete wall as being applied particularly to road side barriers of the New Jersey style, it will be appreciated that it can be applied to conventional brick, stone and rock walls. Moreover, while the invention is particularly adapted for pre-cast structures, it will be appreciated that the principles of the invention, particularly those parts dealing with the formation of the mold, the formation of the joints and the spray application of the pigmented cements to different sectors forming the wall can be applied to form conventional road side retaining walls of cast in situ concrete where the facing only of one side is made according to the principles of the present invention. The wall can be made in sections as is indicated in the above referenced Dexter patents with an earth fill behind the walls. While in the foregoing specification and drawings certain preferred embodiments of the invention have been disclosed and described in detail, including the preferred embodiment, it will be appreciated that other embodiments, adaptations and variations on the structures and/or methods disclosed herein can be utilized without departing from the teachings of this invention and such modifications and adaptations are intended to be encompassed within the claims appended hereto.

Figure 16A:
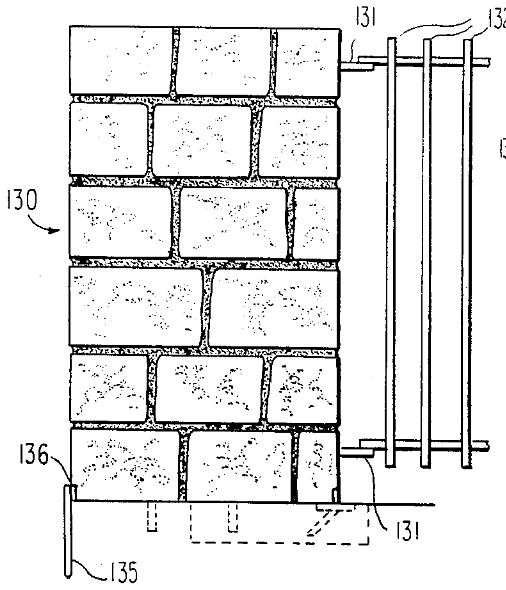
FIG. 16 is a side elevational view of a wrought iron fence column incorporating the invention and FIG. 16*b* is a top view thereof.
Figure 16B:
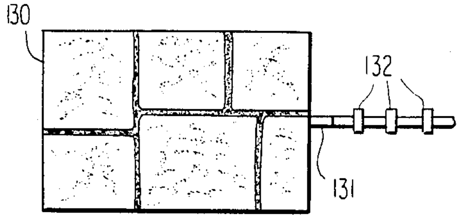

In the embodiment shown in FIGS. **15*a* and 15*b*, a pylon 120 is cast with artificial stones 121 and artificial masonry joints or grooves 122 formed therein in the manner described above. The pylon may be mounted on a slab 125 with weld plates 126 having concrete anchors 127 welded to weld plates 128 having anchor plates 129 in the cast concrete body. The fence column 130 shown in FIGS. 16***a* and 16*b* has steel fence stubs 131 anchored in the precast concrete body thereof and iron fence sections 132 are welded thereto. The column 130 may be anchored to steel stakes 135 by welding between the stakes 135 and weld plates 136 having concrete anchors (not shown) embedded in the precast body thereof and/or, alternatively, mounted on concrete slab foundations.

Figure 17:
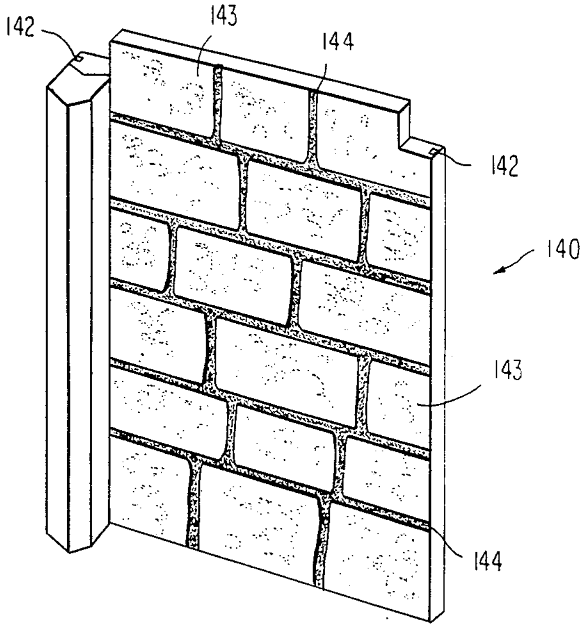
FIG. 17 is an isometric view of a chevron columned wall panel from my U.S. Pat. No. 4,100,705, incorporating the invention.

In FIG. 17, a wall panel 140, constructed as disclosed in my U.S. Pat. No. 4,100,705 and other pending applications, incorporated herein by reference, may have an integral chevron shaped column number 141, if desired, by closing a joint and supporting a roof beam. The panel is formed with integral weld plates 142 and others (not shown) for use in the erection and integration process. As shown, the panel has a stone face 143 with artificial motar joints 144 formed in the manner described earlier. As described in my U.S Pat. No. 4,100,705, and pending applications, insulation may be incorporated in the body thereof.

Figure 18:
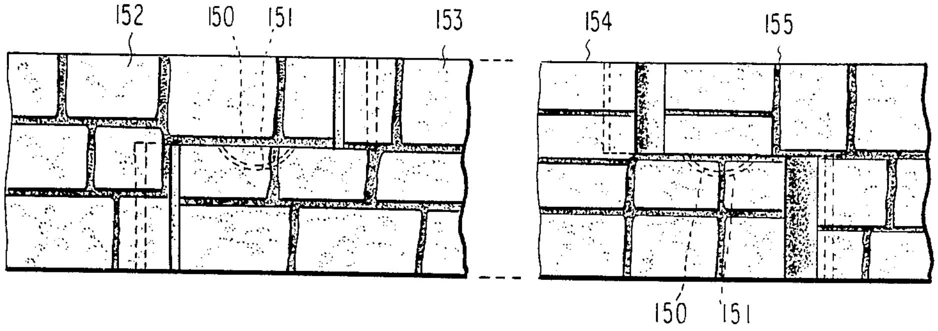
FIG. 18 is a side elevational view of a wall having spherical coupling.
Figure 19:
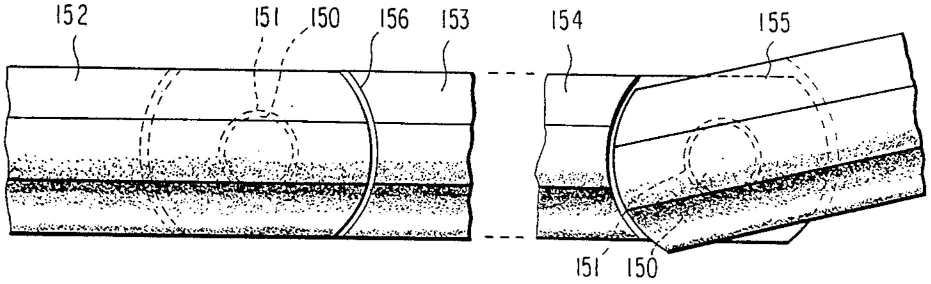
FIG. 19 is a top view of FIG. 18.

The joint shown in FIG. 18 differs from the joint shown in FIGS. 12–14 in that a spherical or rounded hump 150 and complementary concave spherical depression 151 permit angulations between adjacent units 152 and 153. The ends of wall unit 153 are concavely rounded and complementary to the convexly curved or rounded ends of wall unit 152. The convexity-concavity and spherical elements can be reversed in units 152 and 153.

Figure 20:
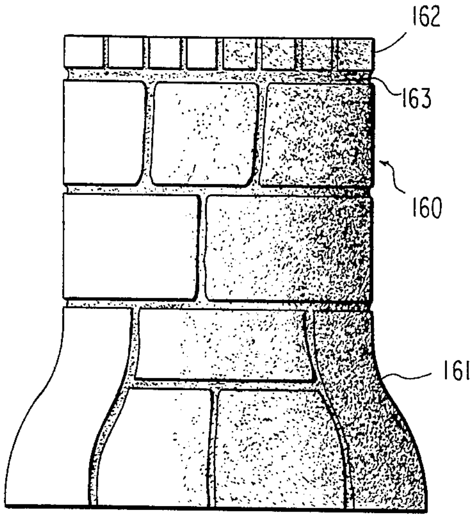
FIG. 20 is a side elevational view of a column incorporating the invention.

The column 160 shown in FIG. 20 has an outwardly flowing skirt 161 and the upper course of masonry can be real or genuine stone or blocks 162 set in mortar 163 in conventional fashion. In fact, all of the precast units may be tapped off with real blocks, stone or block slate to enhance the effect with the bulk being precast and serving as a solid base for laying the genuine or real blocks, stone, brick slate, etc.

Figure 22:
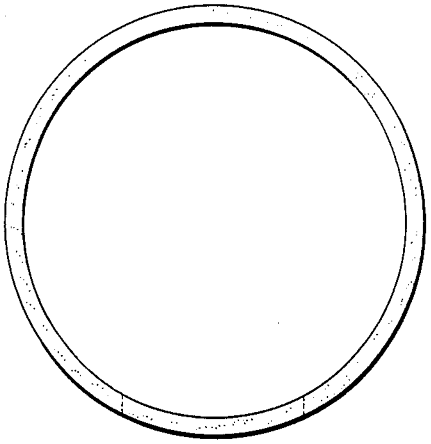
Figure 21:
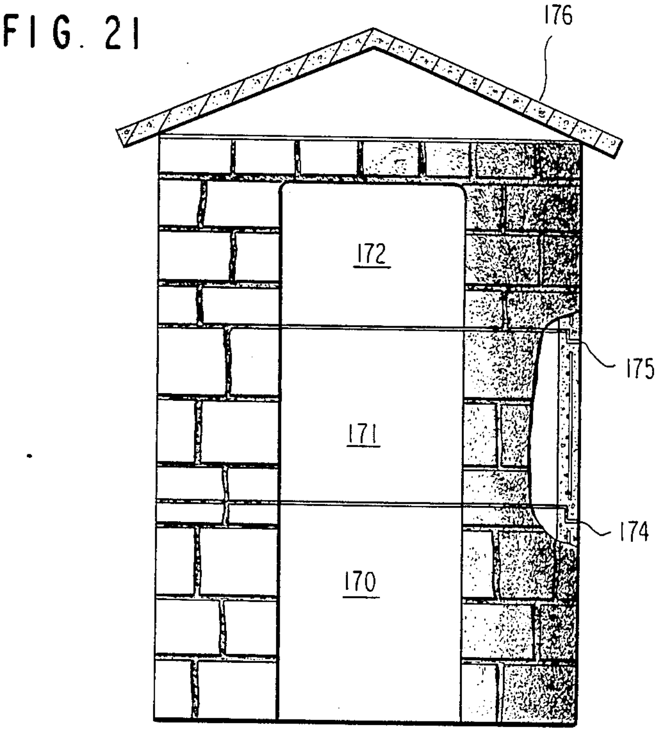
FIG. 21 is an elevational view of a shelter incorporating the invention and, FIG. 22 is a top view thereof.

Finally, the shelter shown in FIGS. 21 and 22 can be constructed of precast concrete rings 170, 171, 172 of the type disclosed in U.S. Pat. No. 4,100,705 having the artificial stone facing 173 and mortar joints 174 and 175 therein. The joints 174 and 175 are as disclosed in said patent and the roof 176, while may be precast, shelters from the weather. Doors, windows, heater elements and the like (not shown) may also be incorporated.

I claim:

1. A method of forming a monolithic decorative surface in a vertical concrete wall and having the appearance of mortar jointed blocks, comprising, (a) forming a mold having a projecting surface pattern of ribs corresponding to a desired pattern of mortar joints, (b) applying a retardant on said ribs to delay the curing of cement contacting same, (c) applying masking to said pattern of ribs, (d) applying a colored cement in selected areas of said mold bounded by said projecting surface pattern of ribs, (e) removing the masking from said pattern of ribs, (f) applying a joint cement to the retardant coated pattern of ribs, (g) filling the mold with concrete (h) inserting a vibrator into said concrete and operating same to assure a mixing at the interfaces between said colored cements and said concrete, (i) allowing the concrete and colored cement to harden, (j) removing the mold, and (k) brushing the joint cement on said ribs which contacted said retardant before said joint cement hardens to give the typical brushed appearance of a mortar joint.

2. The method defined in claim 1 wherein said concrete wall is molded and cured upside down.

3. A method of forming a monolithic decorative surface in a concrete wall as defined in claim 11 including operating a vibrator in said concrete to achieve a blending action between the contiguous poured concrete and colored cement particles.

4. The method defined in claim 1 wherein step(f) consists of spraying said joint cement on said pattern of ribs.

5. A method of forming a monolithic decorative surface in a concrete wall including a decorative highway traffic barricade having the appearance of a stone wall having a vertical boundary, as defined in claim 1, and including the further step of inserting a steel reinforcing member in said concrete wall, and forming said mold by:

(a1) forming a styrofoam surface having at least the vertical boundary of one-half of said mold, (a2) applying radiant energy absorbent substance in said pattern of said mortar joints onto said styrofoam surface, (a3) applying radiant energy to said substance to generate heat and shape said styrofoam thereunder and form grooves and a positive of said mold, (a4) applying a mold forming fluent material to a surface of said styrofoam and in said grooves, and (a5) solidifying said fluent material to form said mold.

6. The method defined in claim 1 wherein step(d) consists of spraying different colored cements in different selected areas, respectively, of said mold.

7. The method defined in claim 6 wherein step(g) includes shielding the sprayed cement areas from penetrating impingements by said concrete during the filling of said mold with concrete.

8. The method defined in claim 1 wherein said vertical concrete wall has a top horizontal surface and a corner formed thereby and wherein the step of applying said colored cement in selected areas includes areas extending into said top horizontal surface, such that a thick layer of said colored cement is applied at the corner formed by said vertical surface adjoining said horizontal surface prior to performing step(g).

9. The method defined in claim 8 wherein the step of applying includes troweling on said thicker layer.

* * * * *